(12) United States Patent
Ramberg

(10) Patent No.: US 9,243,747 B2
(45) Date of Patent: *Jan. 26, 2016

(54) SHADE STRUCTURE

(71) Applicant: Charles E. Ramberg, Karlstad (SE)

(72) Inventor: Charles E. Ramberg, Karlstad (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,913

(22) Filed: Oct. 17, 2013

(65) Prior Publication Data

US 2014/0041555 A1  Feb. 13, 2014

Related U.S. Application Data

(63) Continuation-in-part of application No. 13/275,238, filed on Oct. 17, 2011, now Pat. No. 8,607,714.

(60) Provisional application No. 61/393,840, filed on Oct. 15, 2010.

(51) Int. Cl.

| A47B 37/00 | (2006.01) |
| F16M 13/02 | (2006.01) |
| A45B 25/00 | (2006.01) |
| A45B 11/00 | (2006.01) |
| A45B 17/00 | (2006.01) |
| A47B 97/00 | (2006.01) |
| A45B 23/00 | (2006.01) |
| A47B 37/04 | (2006.01) |

(52) U.S. Cl.
CPC .............. *F16M 13/022* (2013.01); *A45B 11/00* (2013.01); *A45B 17/00* (2013.01); *A45B 23/00* (2013.01); *A45B 25/00* (2013.01); *A47B 97/00* (2013.01); *A45B 2017/005* (2013.01); *A45B 2023/0025* (2013.01); *A45B 2200/1063* (2013.01); *A47B 37/04* (2013.01)

(58) Field of Classification Search
CPC ....... A47B 37/04; A45B 25/00; F16M 13/022
USPC ............ 135/16, 20.1, 20.3, 96, 98; 108/50.12
See application file for complete search history.

(56) References Cited

U.S. PATENT DOCUMENTS

| 2,039,805 | A | * | 5/1936 | Knight ........................ 108/50.12 |
| 2,559,421 | A | * | 7/1951 | Garrett .......................... 248/515 |
| 2,743,146 | A | * | 4/1956 | Wheeler .................... 108/50.12 |
| 2,782,085 | A | * | 2/1957 | Natale .............................. 108/94 |
| 3,434,484 | A | * | 3/1969 | Dilullo ............................ 135/16 |
| 4,353,659 | A | * | 10/1982 | Comte ............................ 403/24 |
| 4,824,108 | A | * | 4/1989 | McLean ........................ 473/474 |
| 6,314,891 | B1 | * | 11/2001 | Larson ............................ 108/44 |
| 6,401,736 | B1 |   | 6/2002 | Jerry |

(Continued)

FOREIGN PATENT DOCUMENTS

JP     2000152864 A    6/2000

OTHER PUBLICATIONS

Office Action received from Swedish Patent Office in Swedish Patent Application No. 1430143-6, Nov. 2014.
Translation of Abstract of JP 2000152864.
Machine translation of JP 2000152864.
Response to Office Action received from Swedish Patent Office in Swedish Patent Application No. 1330131-2.

(Continued)

*Primary Examiner* — Hanh V Tran

(57) ABSTRACT

Various aspects provide for disposing an umbrella over a table. In some cases, an umbrella may be coupled to a table. An umbrella may be disposed at a location other than a center of the table, which may provide for improved shelter from weather arriving at an angle (e.g., wind-driven rain, angled sunlight, and the like).

20 Claims, 9 Drawing Sheets

(56) References Cited

U.S. PATENT DOCUMENTS

| | | | |
|---|---|---|---|
| 6,842,922 B2* | 1/2005 | Smeed | 5/503.1 |
| 7,334,593 B2* | 2/2008 | Avery | 135/88.08 |
| 7,926,496 B2* | 4/2011 | Young et al. | 135/16 |
| 2006/0272555 A1* | 12/2006 | Carter | 108/50.12 |
| 2008/0289586 A1 | 11/2008 | O'Connor | |
| 2009/0026809 A1* | 1/2009 | Reeb et al. | 297/16.1 |

OTHER PUBLICATIONS

Response filed Mar. 2015 with Swedish Patent Office in response to Office Action of Nov. 2014, Swedish Patent Application No. 1430143-6.

Office Action received from Swedish Patent Office in Swedish Patent Application No. 1330131-2, May 2014.

* cited by examiner

SHADE STRUCTURE

CROSS REFERENCE TO RELATED APPLICATIONS

This application is a continuation in part and claims the priority benefit of U.S. patent application Ser. No. 13/275,238, filed Oct. 17, 2011, which claims the priority benefit of U.S. provisional patent application No. 61/393,840, filed Oct. 15, 2010, the disclosures of which are incorporated by reference herein.

TECHNICAL FIELD

The present invention relates generally to providing shelter from sunlight, weather, and the like.

BACKGROUND

People seated at a table (e.g., picnic table) may desire protection from the sun, rain, snow, and the like (hereinafter: weather). In some cases, weather may descend from directly overhead. In some cases, weather may arrive at the table at an angle. For example, a table may receive sunlight at an angle, particularly in winter and/or far from the equator. Wind-driven rain may fall at an angle. An umbrella disposed over a center of a table may not protect the entire table from weather arriving at an angle. An improved apparatus would provide for adjustability with respect to incoming weather, such that protection from the weather may adapt to the changes. Some umbrellas require a stand, which may be heavy and expensive. An improved apparatus would reduce fabrication and transportation costs.

SUMMARY OF THE INVENTION

Protecting a table or other surface from weather (e.g., arriving at an angle) may include adjusting a protective device (e.g., an umbrella) to different positions, such as a position other than directly overhead a center of the table. One or more couplings and/or receivers may be configured to removably (e.g., adjustably) attach a mast to a table, to provide for adjusting an angle of the mast via a combination of movable attachment positions and couplings/receivers that allow for pivoting of the mast.

Some umbrellas may be shaped in a manner that matches or otherwise complements the shape of a table coupled to the umbrella. Some umbrellas may be shaped to match an arrangement of tables (e.g., a plurality of parallel tables, angled toward the sun, and a plurality of parallel umbrellas shaped to provide contiguous protection across the tables). In some embodiments, an umbrella and table are coupled via the mast, such that the table supports the mast of the umbrella, which may eliminate the need for a base or stand for the umbrella.

An apparatus may comprise a mast coupled to a table with a coupling. A table may comprise a top, a receiver in the top that is configured to receive a mast, a leg, optionally a brace. One or more couplings may removably couple the mast to the top, leg, and/or brace in a manner that provides for adjustability of the mast. In some cases, a receiver is also a coupling. A receiver may include a hole in the top. The coupling may provide lateral, vertical, angular, and/or sliding/rolling adjustability to position the mast at different positions and/or angles with respect to the top. The mast may dispose an umbrella over the table.

A coupling may include a mast attachment configured to removably attach to a mast, a table attachment configured to removably attach to a table, and a first pivot connecting the mast attachment to the table attachment. The mast attachment, table attachment, and first pivot may be adjustable to provide for disposing the mast at a plurality of angles between the mast and a top of the table. A coupling may attach to a top, brace, leg, or another part of the table as needed to secure the mast. A mast attachment may provide for moving the mast in a direction aligned with the mast.

A table may comprise a top, a leg, and optionally a brace (to brace the top and/or leg). A first coupling may be coupled to the leg or brace via the table attachment, and may be configured to couple a first portion of the mast to the leg or brace via the mast attachment. A receiver and/or second coupling may couple a second portion of the mast to the top. The first and second portions of the mast may define an angle, which may be changed by adjusting a coupling and/or receiver to different positions (e.g., along the top, brace, or leg). The couplings and/or receiver may allow the mast to pivot, providing for a plurality of angles between the mast and the table.

An umbrella may have a length greater than a width. A shape of the umbrella (e.g., aspect ratio between length and width) may be chosen to match a shape of a table to which the umbrella is coupled. A mast may include a hinge (e.g., to keep an umbrella parallel to the ground as mast angle changes).

DETAILED DESCRIPTION OF THE INVENTION

Figure 1:
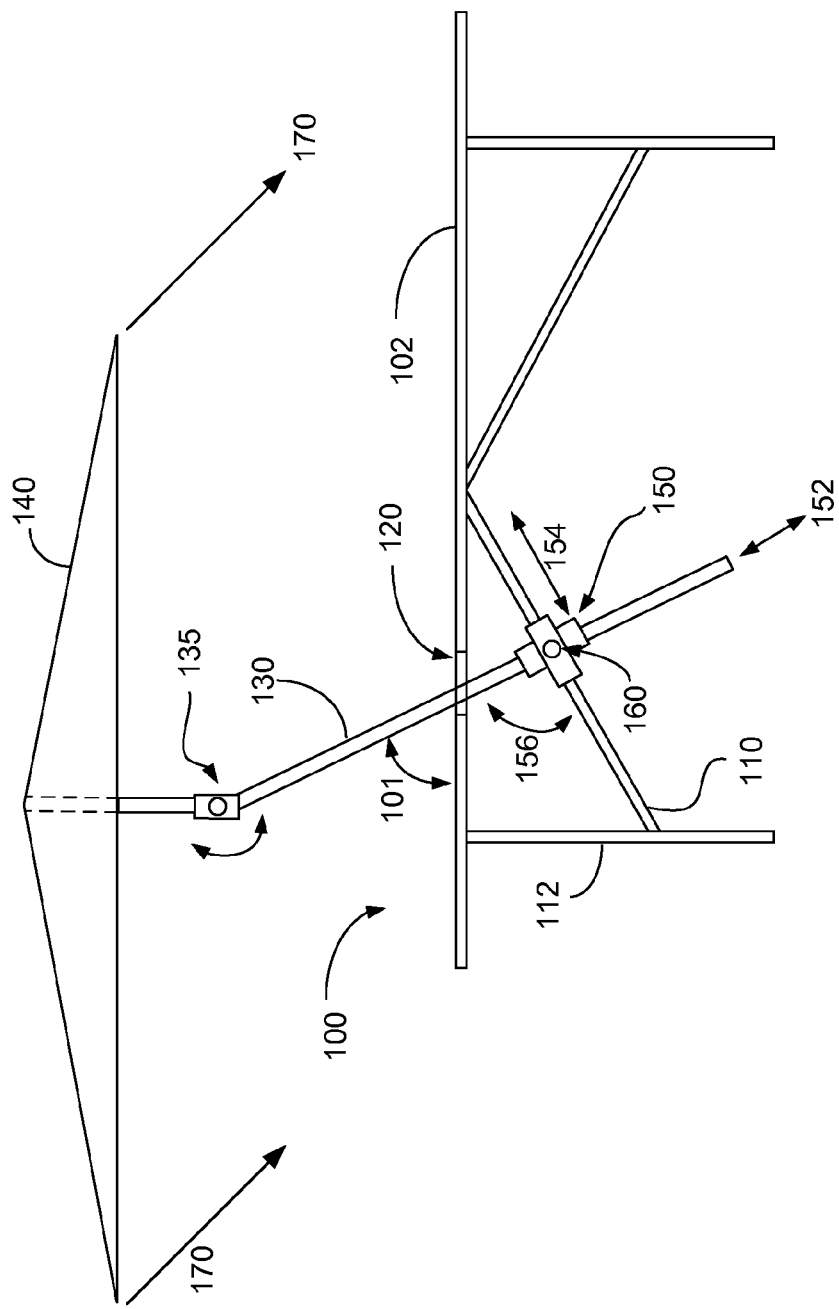
FIG. 1 is a diagram of an apparatus in an embodiment.

FIG. 1 is a diagram of an apparatus in an embodiment. A table 100 may include a top 102 and one or more legs 112. An optional brace 110 may stabilize a leg and/or the top (e.g., fixing the leg at a 90 degree angle with respect to the top). Brace 110 may brace other components (e.g., connect a first leg to a second leg). Brace 110 and/or leg 112 may be adjustable (e.g., pivotable to collapse the table, extendible to change height, etc.). At least a portion of brace 110 may be vertical, horizontal, and/or angled (e.g., between top 102 and leg 112), and may be disposed below top 102. A brace may be located above top 102. Brace 110 may be strong enough (e.g., stiff enough in bending between its attachment points) to support an umbrella (e.g., wind loaded) via a mast coupled to the brace. Brace 110 may be straight and/or curved.

Mast 130 may be connected to umbrella 140. Some masts 130 may include a hinge 135, which may provide for changing an angle between umbrella 140 and mast 130 (e.g., to keep umbrella 140 level as an angle of mast 130 is changed, or to angle umbrella 140 with respect to mast 130).

Mast 130 may be coupled or connected to table 100 in a manner that provides for adjusting an angle 101 of mast 130

(e.g., with respect to top 102) to move umbrella 140 to different positions (e.g., from centered to off center).

One or more couplings 150 may couple mast 130 to the table (in this example, to brace 110). A coupling may couple a mast to a leg, a brace, a top, and/or other portion of the table. Coupling 150 may provide for lateral movement 154 (e.g., by sliding, rolling, removable gripping, pins/receptacles, and the like). Coupling 150 may provide for "vertical" adjustment (e.g., movement in direction 152) of mast 130. Coupling 150 may include a pivot 160 to allow rotation (e.g., changing an angle 156 between mast 130 and, in this case, brace 110). Pivot 160 may include a freely rotating hinge. Pivot 160 may include a tightening or locking mechanism that affixes mast 130 at a desired angle.

Top 102 of table 100 may include one or more receivers 120 configured to couple to mast 130. A coupling or receiver may constrain motion in some directions and provide for motion in other directions. For example a receiver 120 may confine or constrain mast 130 vertically and laterally, and allow mast 130 to pivot (e.g., over a desired range of angles 101, such as at least 15 degrees, 30 degrees, or at least 45 degrees) with respect to top 102. Some receivers may allow mast 130 to slide (e.g., in direction 152, in a direction along the table top, and the like). Some receivers may removably grip mast 130. Some receivers 120 provide for positioning mast 130 at different positions (e.g., along the top 120). Receiver 120 may include a hole, which may be sized in at least one dimension to approximately match a cross section of mast 130 (e.g., slightly larger than the diameter of a cylindrical mast 130). Holes in receiver 120 may be round, elliptical, square rectangular, curved, or otherwise shaped. In some embodiments, receiver 120 is disposed away from the middle of top 102 (e.g., in a long direction characterizing table 100, and/or along a "width" of table top 102, and the like). Receiver 120 may comprise a coupling 150.

Coupling 150 and receiver 120 may include a pivot 160 and/or provide for pivoting of mast 130, and may allow mast 130 to be adjusted in direction 152. By aligning table 100 with respect to incoming weather (e.g., aligning a long direction of the table with an incoming direction of the sun, wind, and the like), and adjusting various apparatus (e.g., varying the position of coupling 150 along brace 110, and/or height of umbrella 140), umbrella 140 may be adjusted to shelter table 100 from weather arriving at different angles. For example, mast 130 may be oriented toward the sun in a manner that positions umbrella 140 in a position other than directly above table 100, which may increase the area of top 102 sheltered by umbrella 140.

In the configuration shown in FIG. 1, top 102 may be shaded from sunlight or rain arriving in direction 170 by angling mast 130 to place umbrella 140 off center (as shown). Configurations may be adapted to changing weather conditions (e.g., time of day, season, wind speed) by adjusting various angles and distances to reposition umbrella 140, and optionally by repositioning table 100 with respect to incident weather. A long dimension of table 100 may be aligned with its own shadow at noon. A relative position of umbrella 140 with respect to the surface (and/or seats) of table 100 may be chosen to maximize the protection of the table by the umbrella. In some embodiments, at least one of coupling 150 and receiver 120 attaches umbrella 140 to table 100, which may eliminate the need for a heavy stand or base to support mast 130.

A coupling or receiver may be adjustable to provide for motion as needed or constrain motion as needed. An interface between a coupling or receiver and the table may comprise a grip configured to grip a corresponding feature on the table, such as a leg, brace, rail, or top, and a corresponding grippable feature (e.g., the leg itself, a rail attached to a brace, the top, etc.). Vice versa, a table may include a grip configured to grip a feature on the coupling or receiver. The interface may include one or more movable pins (e.g., on the coupling) that fit into corresponding receptacles (e.g., on the table). A coupling and/or receiver may slide or roll along a feature. A feature (and/or leg or brace) may be tubular, and a coupling may include a circular portion (e.g., a u-bolt) to grip the tube.

Figure 2:
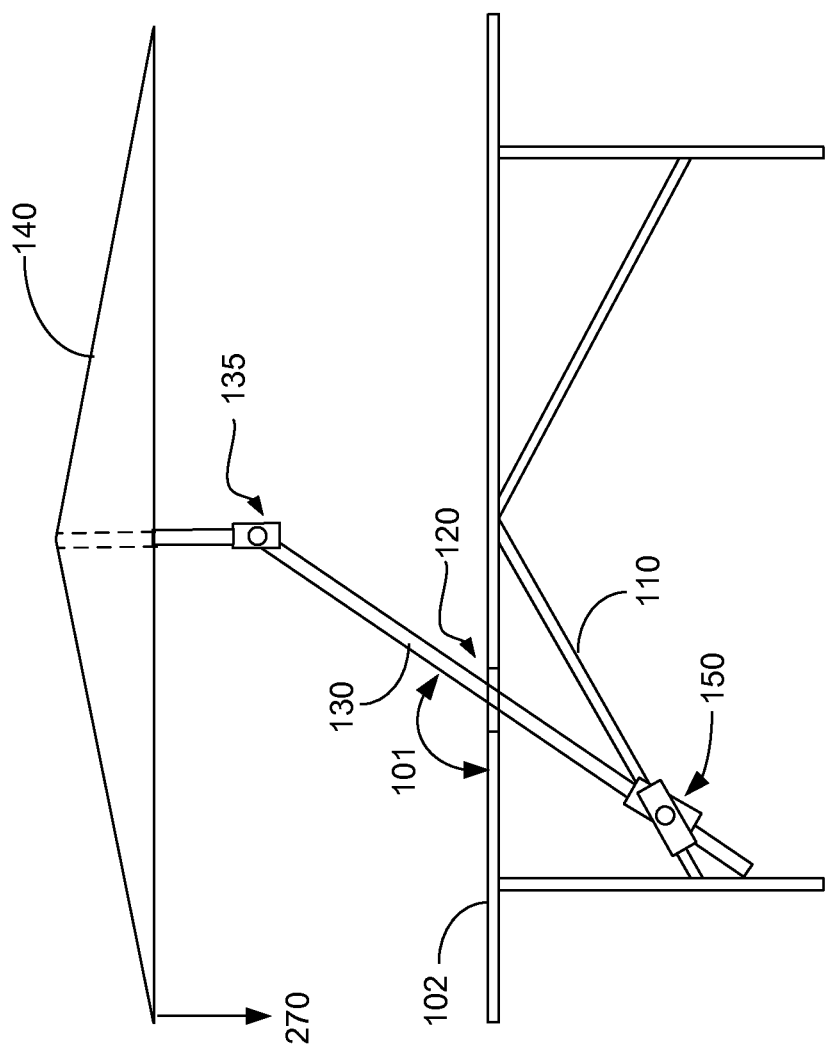
FIG. 2 illustrates a different configuration of an apparatus, according to some embodiments.

FIG. 2 illustrates a different configuration of an apparatus, according to some embodiments. In FIG. 2, coupling 150 has been adjusted (and receiver 120 has allowed mast 130 to pivot) to reposition umbrella 140 with respect to the position in FIG. 1 (in this case, over the center of the table). In some embodiments, coupling 150 moves to change angle 101; in some embodiments, a receiver 120 moves to change angle 101. Both coupling 150 and receiver 120 may move in some embodiments. An upper portion of mast 130 (e.g., proximate to umbrella 140) may, at a first mast angle 101, be positioned over the center of top 102, and at a second mast angle 101, be positioned a distance from the center of top 102.

A coupling and/or receiver may be loosened, moved, and tightened to reposition the portion of mast 130 to which it's coupled to change angle 101. For example, by moving coupling 150 along brace 110 and moving mast 130 in direction 152 (FIG. 1) within coupling 150 and receiver 120 (both of which may allow pivoting) angle 101 may be chosen to place umbrella 140 substantially directly above the center of top 102 (e.g., for overhead weather in direction 270) or away from the center of top 102 (e.g., for angled weather in direction 170) as weather conditions require. In some embodiments hinge 135 may adjust umbrella 140 to a variety of angles between mast 130 and top 102. A position of mast 130 in receiver 120 may be changed to adjust an angle between mast 130 and top 102.

Movement of a receiver and/or coupling may "sweep" mast 130 over a virtual "surface" in the air (as if waving a wand). In an embodiment, mast 130 moves through a surface comprising a plane of positions which may be parallel with a long direction of a table (so that umbrella 140 moves in a direction parallel to the long direction). The surface may be parallel to a width of the table. A curved brace or leg (and/or curved receiver) may be used to sweep mast 130 through curved shape (e.g., sweeping a conical surface). A receiver and/or coupling that adjusts in both length and width directions of the table (e.g., with a curved receiver or brace) may be used to move umbrella 140 in an arc (e.g., to follow the sun). Hinge 135 may pivot portions of mast 130 within a plane defined by motion of a receiver and/or coupling. Hinge 135 may pivot in another direction (e.g., a coupling changes mast angles to move umbrella 140 lengthwise along top 102, and hinge 135 moves umbrella 140 widthwise along top 102).

Figure 3:
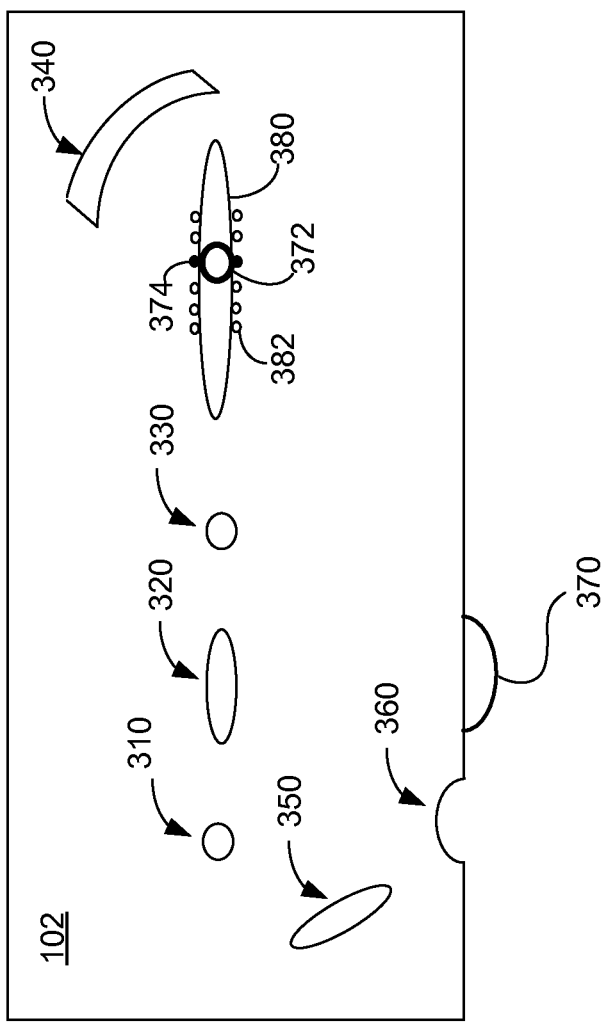
FIG. 3 illustrates several exemplary receivers, according to some embodiments.

FIG. 3 illustrates several exemplary receivers, according to some embodiments. Receiver 310 may include a round hole, and may be disposed away from a center of top 102 (e.g., in the "long" direction of top 102). Receiver 320 may include an elliptical hole. Receivers may include square, rectangular, triangular, hexagonal, and/or octagonal holes (e.g., to match a corresponding mast). Receiver 330 may include a hole disposed in a center of top 102. Receiver 340 may include a curved hole. Receivers 340 and 350 may include an elongated hole that provides for moving a position of mast 130 (FIG. 1) in both "lengthwise" and "widthwise" directions. Receiver 360 may include a notch or other feature (e.g., at an edge of top 102). Receiver 370 may include a rail or bracket (e.g., a U-shaped bracket). Receiver 380 may include a hole and a clamp 372. Clamp 372 may be adjustable (e.g., to different locations within the hole associated with receiver 380). Clamp 372 may removably grip or otherwise affix other apparatus (e.g., mast 130, FIG. 1). Claim 372 may include a rail and a feature that grips the rail. In exemplary receiver 380, clamp 372 includes a plurality of pins 374 sized to match corresponding receptacles 382. Pins 374 may be inserted into receptacles 382 to position clamp 372 in a desired position. Pins 374 may be retracted, clamp 372 (and mast 130) may be moved to another position, then pins 374 may be inserted into new corresponding receptacles 382 to reposition mast 130.

In some embodiments, an actuator (e.g., a motor, a solenoid, an hydraulic cylinder, and the like) may be coupled to at least one of a mast, receiver, coupling, and/or table, and may be configured to adjust an angle of the mast (and/or position of an umbrella). An actuator may be configured to track incoming weather (e.g., via a sensor) and adjust the mast accordingly. In some embodiments, a desired position is detected (e.g., an angle of the sun) and an umbrella is adjusted to optimize exposure to (e.g., shading from) weather. A clock signal and/or location signal (e.g., from a GPS signal, a digital compass, and the like) may be used to determine a position of the sun. A weather sensor (e.g., wind sensor, photodiode, photovoltaic cell and the like) may be used to determine a desired position for mast 130. In some embodiments, an umbrella, shade, solar panel and/or other feature (e.g., attached to a mast) may be configured to "track" incoming weather by monitoring the weather, calculating whether or not mast 130 is optimally positioned (e.g., maximizing shade to table top 102) and adjusting a receiver or coupling accordingly if needed.

Figure 4:
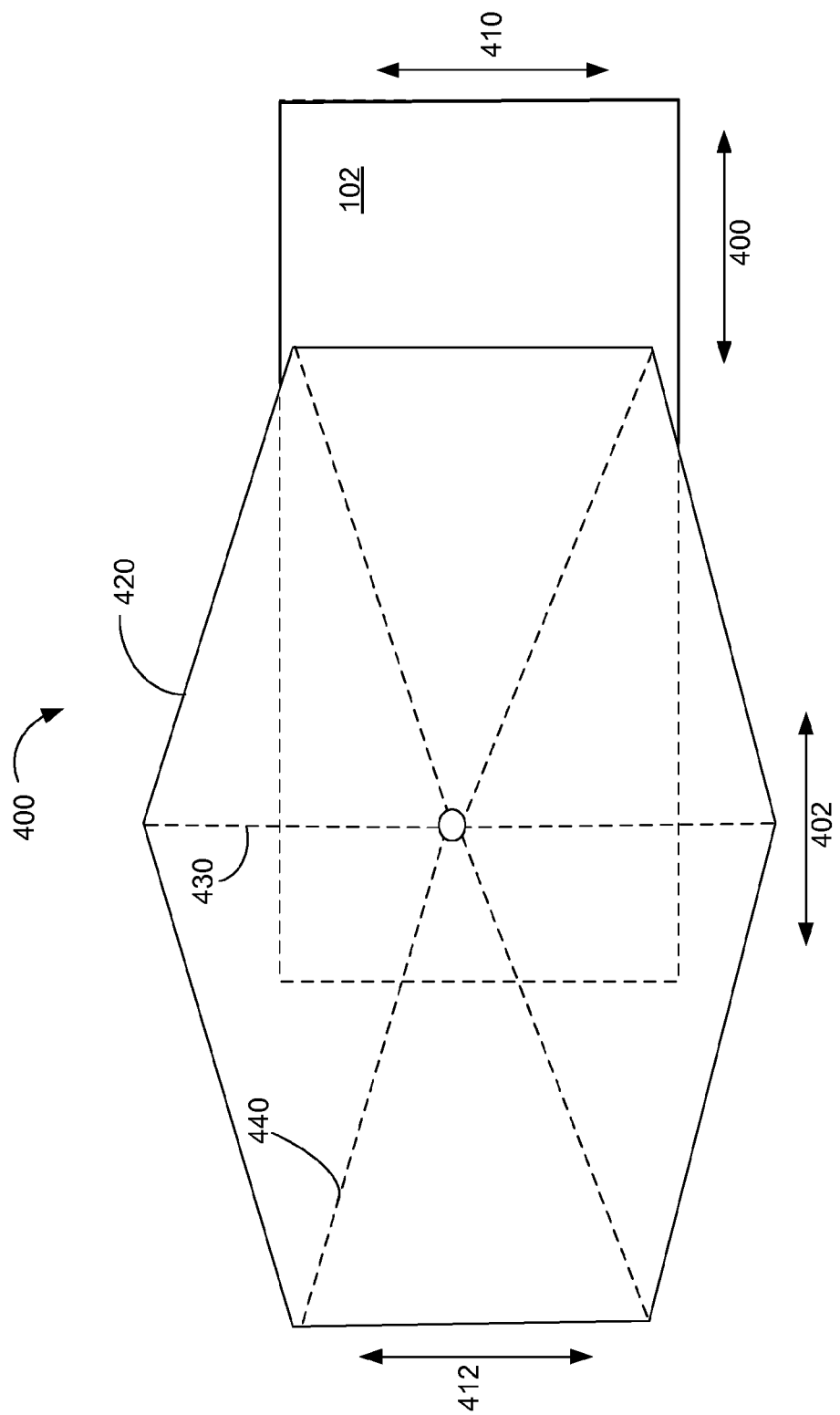
FIG. 4 illustrates an exemplary configuration of an apparatus as viewed from above, according to some embodiments.

FIG. 4 illustrates an exemplary configuration of an apparatus as viewed from above, according to some embodiments. Apparatus 400 may include an umbrella 420 disposed over a top 102 with a mast, coupling, and receiver (not shown). Umbrella 420 may be positioned (e.g., as in FIG. 4) to shade top 102 from sunlight incipient at an angle (e.g., with the sun on the "left" side of the page).

Top 102 may be longer in a length 400 than in a width 410. Umbrella 420 may be longer in a length 402 than a width 412. Umbrella 420 may include a flexible cover (e.g., nylon or canvas), which may be supported by support arms. Umbrella 420 may include a first arm 440 that is longer than a second arm 430. In some embodiments, a shape (e.g., as viewed from above) of an umbrella is similar to (e.g., matches) the shape of the table with which the umbrella may be used. An umbrella may be symmetrical (e.g., with respect to the mast) in direction 410 and/or 400. An umbrella may be asymmetrical, and have one arm 430 laterally "longer" than an opposite arm 430. In some configurations, a receiver is disposed off-center (e.g., in direction 410) and a matching umbrella is asymmetrical, such that the umbrella shelter is centered on the table, notwithstanding the off center receiver. A curved and/or angled mast 130 may be used to center an umbrella over a top having an off-center receiver.

Figure 5:
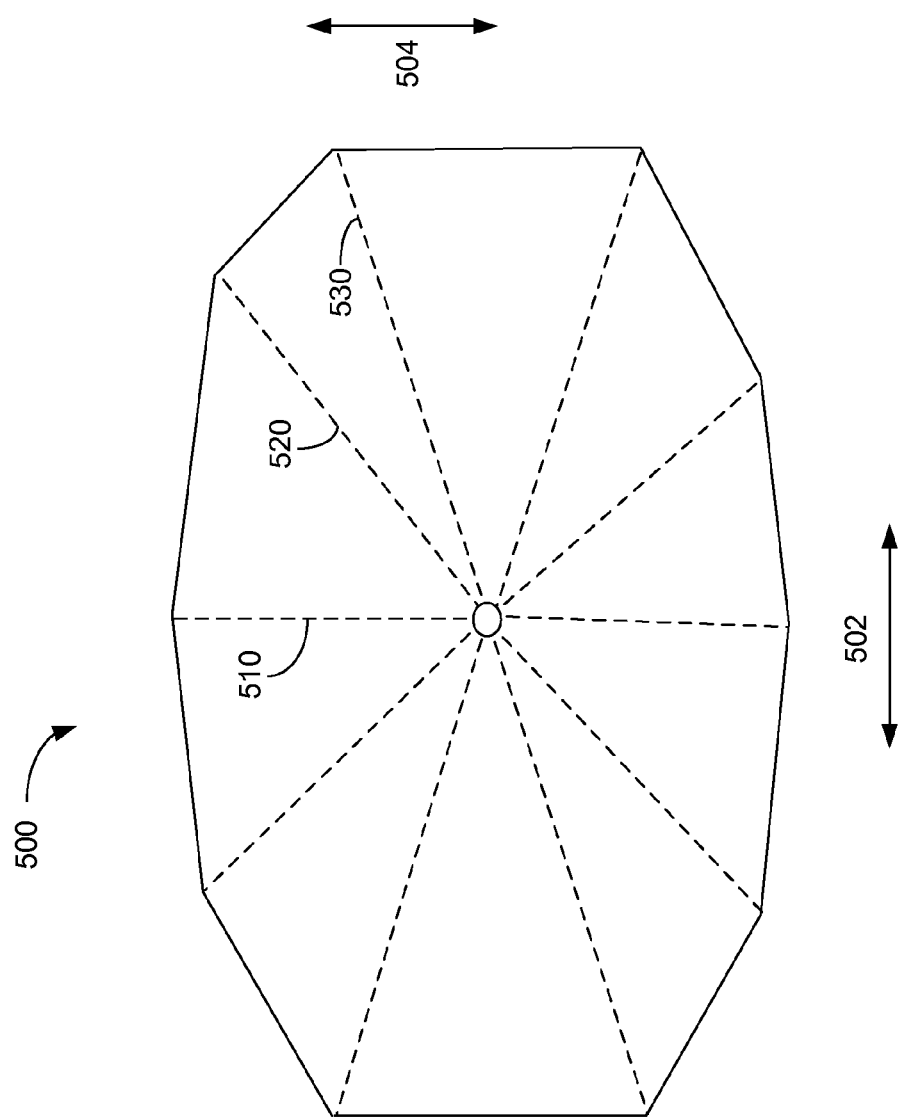
FIG. 5 illustrates an exemplary umbrella, according to some embodiments.

FIG. 5 illustrates an exemplary umbrella, according to some embodiments. Umbrella 500 includes a first arm 510, a second arm 520, and a third arm 530. In some cases, umbrella 500 may be longer in a first direction 502 than in a second direction 504. In some cases, third arm 530 is longer than at least one of, and sometimes both of first arm 510 and second arm 520. In some cases, second arm 520 is longer than at least one of, and sometimes both of, first arm 510 and third arm 530. In some cases, first arm 510 is shorter than second arm 520 and third arm 530, which may be approximately the same length.

In some embodiments, a cross section of a mast is square, rectangular, and/or otherwise shaped to restrain rotation of the mast (e.g., to maintain an angular orientation of an umbrella with respect to the table). A cross section of a rectangular mast may be longer in the long direction of the table to increase stiffness of the mast to a bending moment generated at receiver 120 by umbrella 140 and coupling 150 (e.g., at angles 101 far from 90 degrees).

Figure 6:
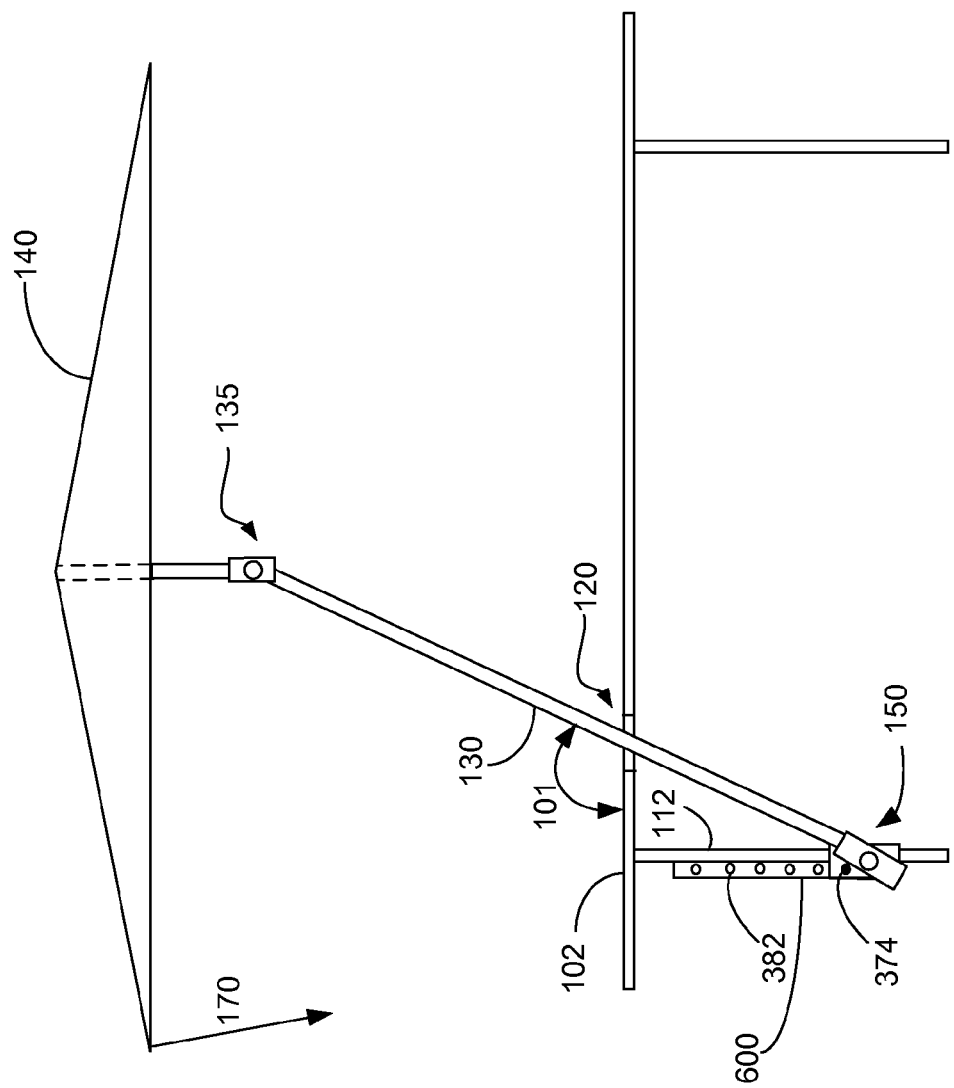
FIGS. 6 and 7 illustrate configurations of an apparatus according to some embodiments.
Figure 7:
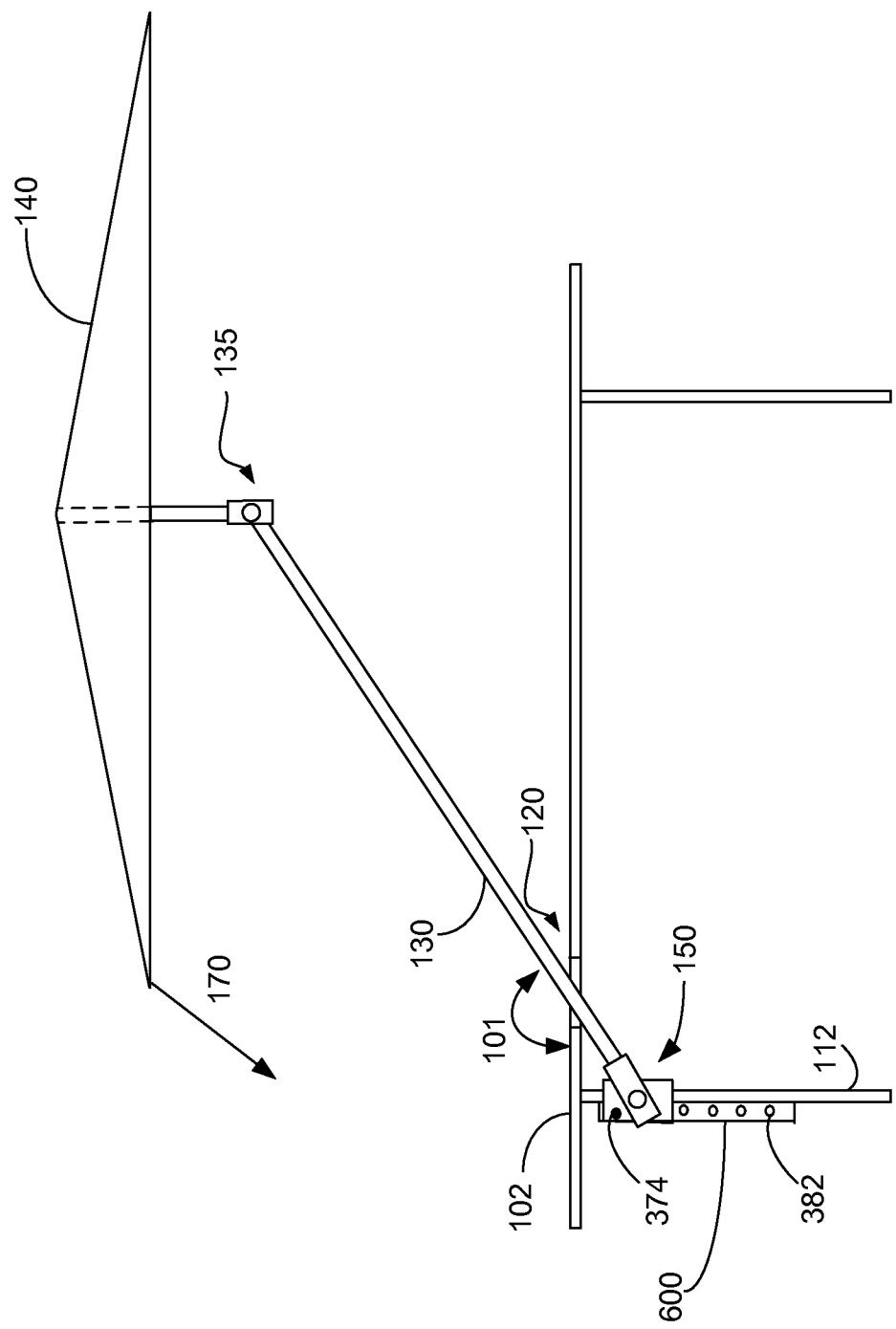

FIGS. 6 and 7 illustrate configurations of an apparatus according to some embodiments. Coupling 150 may be used to removably attach mast 130 to leg 112. In FIG. 6, coupling 150 is coupled to rail 600. Rail 600 includes a plurality of receptacles 382, into which a pin 374 on coupling 150 may be inserted. Coupling 150 may be moved to different positions along rail 600 to adjust angle 101.

Figure 8:
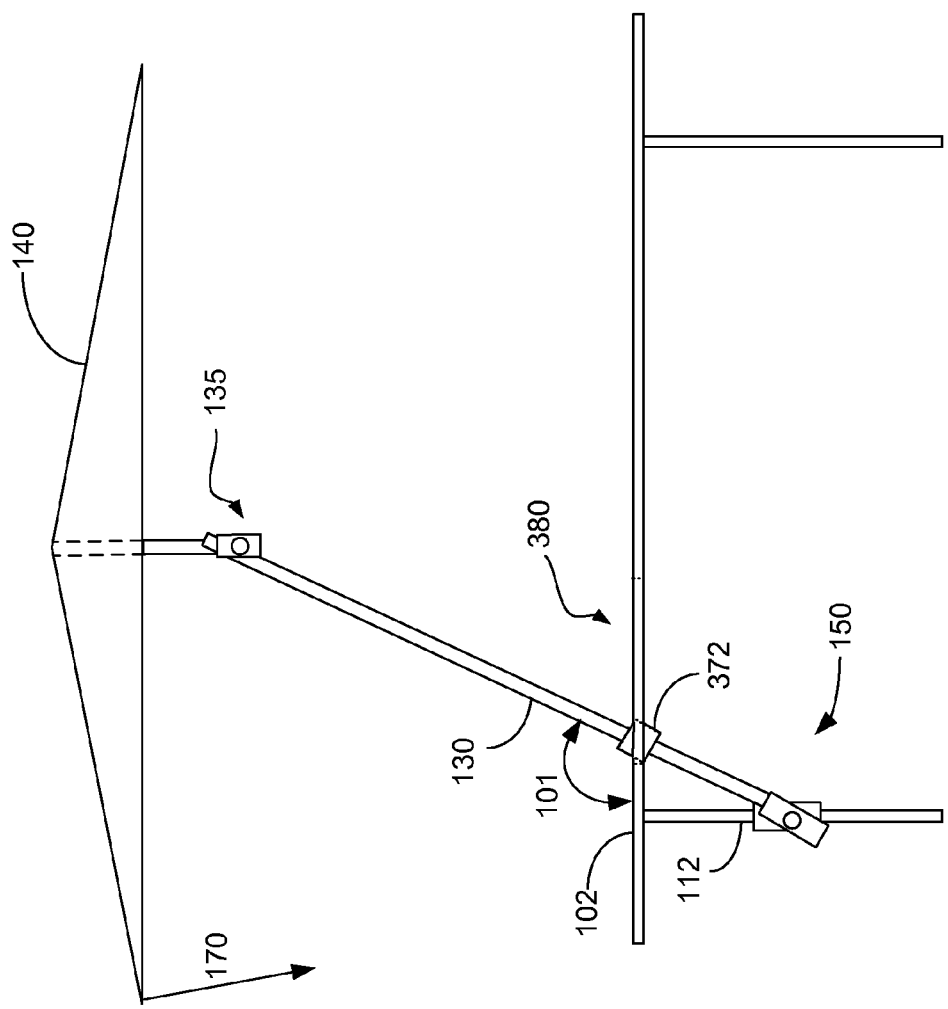
FIGS. 8 and 9 illustrate configurations of an apparatus according to some embodiments.
Figure 9:
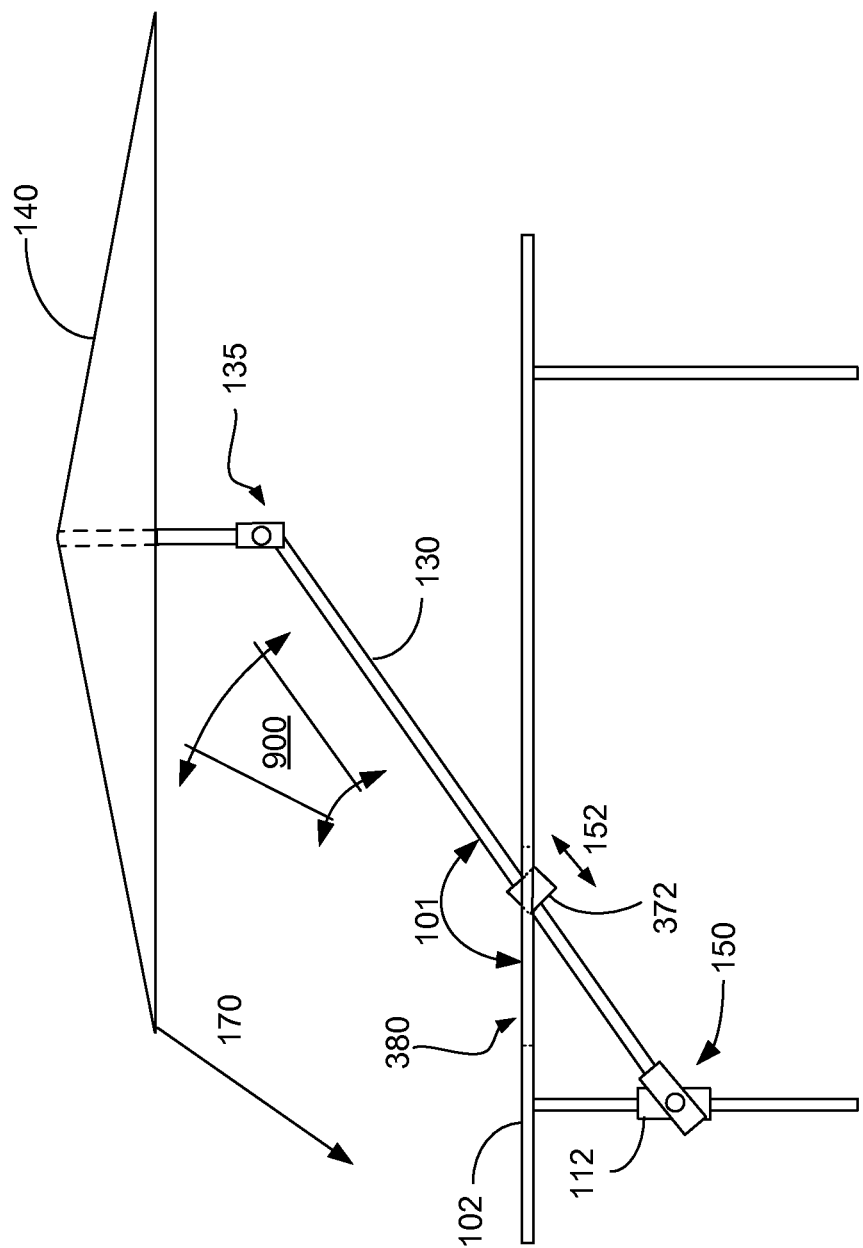

FIGS. 8 and 9 illustrate configurations of an apparatus according to some embodiments. Receiver 380 may be used to move a portion of mast 130 held by clamp 372 to different positions along top 102. In this example, clamp 372 may allow for mast movement in direction 152, reducing or eliminating the need for lateral motion of coupling 150 (e.g., along leg 112). In some embodiments, a receiver 380 provides for motion of a first portion of mast 130 and a coupling 150 provides for motion of a second portion of mast 130. The first and second portions may move in different directions (e.g., to move mast 130 through a nonplanar "surface"). FIG. 9 illustrates a portion of an exemplary virtual "surface" 900 swept by mast 130 as mast angle is adjusted.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An attachment system for coupling a mast to a table, the attachment system comprising:
   a receiver configured to couple the mast to a top of the table, the receiver comprising:
      a first mast attachment configured to removably attach to the mast;
      a first table attachment configured to removably attach to the top; and
      a first pivot connecting the first mast attachment to the first table attachment; and
   a coupling configured to couple the mast to at least one of a leg of the table and a brace of the table, the coupling comprising:
      a second mast attachment configured to removably attach to the mast;
      a second table attachment configured to removably attach to the leg or brace of the table; and
   a second pivot connecting the second mast attachment to the second table attachment;
   wherein at least one of the receiver and the coupling is configured to be adjustable along the respective top, leg, or brace to which it is coupled to provide for a plurality of angles between the mast top of the table.

2. The attachment system of claim 1, wherein:
   at least one of the table attachments comprises at least one of:
      a pin configured to fit into a corresponding receptacle in the table; and
      a receptacle configured to receive a corresponding pin connected to the table.

3. The attachment system of claim 2, further comprising a table having at least one of:

the receptacle configured to receive a corresponding pin of the table attachment, and the pin configured to fit into a corresponding receptacle of the table attachment.

4. An apparatus comprising:
a table having a top and at least one leg;
a receiver coupled to the top and configured to receive a mast; and
a first coupling comprising:
  a mast attachment configured to removably attach to the mast;
  a table attachment configured to removably attach to the leg; and
  a first pivot connecting the mast attachment to the table attachment;
the first coupling coupled to the leg via the table attachment, the first coupling configured to couple the mast to the leg, at an angle of the mast with respect to the top, that is at least partially defined by:
  a first portion of the mast coupled to the leg; and
  a second portion of the mast coupled to the receiver; and
at least one of the first coupling and receiver is adjustable to different positions to provide for different angles of the mast by moving its respective portion of the mast to the different positions.

5. The apparatus of claim 4, wherein the adjustable first coupling or receiver comprises at least one of:
a pin configured to fit into a corresponding receptacle connected to the table; and
a receptacle configured to receive a corresponding pin connected to the table.

6. The apparatus of claim 4, wherein the receiver comprises a second coupling comprising:
a second mast attachment configured to removably attach to the mast;
a second table attachment configured to removably attach to the top; and
a second pivot connecting the mast attachment to the table attachment.

7. The apparatus of claim 4, wherein:
the top has a length greater than a width;
the different angles of the mast define a plane, and
the plane is parallel to a first direction that is parallel to the length.

8. The apparatus of claim 4, further comprising a mast, wherein, at a first angle of the mast, an upper portion of the mast is disposed above the top and at a center of the table, and at a second angle of the mast, the upper portion is disposed a first distance from the center of the table.

9. The apparatus of claim 4, wherein the different positions comprise different positions along both a length and a width of the table.

10. The apparatus of claim 8, further comprising an umbrella attached to the mast, the umbrella having an aspect ratio that matches that of the table.

11. The apparatus of claim 10, wherein the umbrella has an umbrella length greater than an umbrella width.

12. An apparatus comprising:
a table having a top and at least one brace;
a receiver coupled to the top and configured to receive a mast; and
a first coupling comprising:
  a mast attachment configured to removably attach to the mast;
  a table attachment configured to removably attach to the brace; and
  a first pivot connecting the mast attachment to the table attachment;
the first coupling coupled to the brace via the table attachment, the first coupling configured to adjustably couple the mast to the brace, at an angle of the mast, with respect to the top, that is at least partially defined by:
  a first portion of the mast coupled to the brace; and
  a second portion of the mast coupled to the receiver; and
at least one of the first coupling and receiver is adjustable to different positions to provide for different angles of the mast by moving its respective portion of the mast to the different positions.

13. The apparatus of claim 12, further comprising at least one leg connected to the top and the brace, the brace connecting the top and leg in a manner that controls an angular displacement of the top with respect to the leg.

14. The apparatus of claim 12, wherein the adjustable first coupling or receiver comprises at least one of:
a pin configured to fit into a corresponding receptacle connected to the table; and
a receptacle configured to receive a corresponding pin connected to the table.

15. The apparatus of claim 12, wherein the receiver comprises a second coupling comprising:
a second mast attachment configured to removably attach to the mast;
a second table attachment configured to removably attach to the top; and
a second pivot connecting the mast attachment to the table attachment.

16. The apparatus of claim 12, wherein:
the top has a length greater than a width;
the different angles of the mast define a plane, and
the plane is parallel to a first direction that is parallel to the length.

17. The apparatus of claim 12, further comprising a mast, wherein, at a first angle of the mast, an upper portion of the mast is disposed above the top and at a center of the table, and at a second angle of the mast, the upper portion is disposed a first distance from the center of the table.

18. The apparatus of claim 17, wherein the first distance is in a direction along both a length and a width of the table.

19. The apparatus of claim 17, further comprising an umbrella attached to the mast, the umbrella having an aspect ratio that matches that of the table.

20. The attachment system of claim 1, further comprising:
the table, the table having a top and at least one leg,
the receiver coupled to the top of the table via the first table attachment;
the coupling coupled to the leg of the table via the second table attachment;
the mast; and
an umbrella connected to the mast, the umbrella having an aspect ratio that matches that of the table.

* * * * *